United States Patent [19]

Levine et al.

[11] 3,945,963

[45] Mar. 23, 1976

[54] WATER-BASED EPOXY ACRYLIC COATING COMPOSITIONS

[75] Inventors: Morris Levine, Cleveland Heights; Michael Yurcheshen, Parma Heights; Roland W. Hight, Brook Park, all of Ohio

[73] Assignee: PPG Industries, Inc., Pittsburgh, Pa.

[22] Filed: Jan. 7, 1974

[21] Appl. No.: 431,449

[52] U.S. Cl. 260/29.6 NR; 260/29.6 TA; 260/837 R; 260/901
[51] Int. Cl.² ......................................... C08L 63/10
[58] Field of Search..... 260/29.6 NR, 29.6 TA, 901, 260/837 R

[56] References Cited
UNITED STATES PATENTS

| | | | |
|---|---|---|---|
| 2,954,358 | 9/1960 | Hurwitz | 260/29.6 |
| 3,118,848 | 1/1964 | Lombardii et al. | 260/29.6 |
| 3,238,170 | 3/1966 | Wolff et al. | 260/29.6 |
| 3,290,417 | 12/1966 | Christenson et al. | 260/901 |
| 3,399,248 | 8/1968 | Wolinski | 260/837 |
| 3,492,252 | 1/1970 | Euchner et al. | 260/29.6 |
| 3,494,847 | 2/1970 | Yurcheshen et al. | 260/29.6 |
| 3,509,086 | 4/1970 | Rohrbacher, Jr. | 260/837 |
| 3,651,649 | 3/1972 | Najvar et al. | 260/837 |
| 3,652,478 | 3/1972 | Ishii et al. | 260/29.6 |
| 3,719,629 | 3/1973 | Martin et al. | 260/29.6 |

*Primary Examiner*—Eugene C. Rzucidlo
*Attorney, Agent, or Firm*—Frank J. Troy

[57] ABSTRACT

A coating composition comprising an emulsion of a partially-solubilized polymeric binder in water; wherein the polymeric binder comprises:

A. from about 25 to about 75 percent by weight of an acrylic interpolymer derived from an alkyl acrylate or methacrylate ester, an ethylenically unsaturated carboxylic acid and, optionally, at least one other copolymerizable ethylenically-unsaturated monomer, wherein at least part of the acid carboxylic groups have been iminated with an alkylenimine; and B. from about 25 to about 75 percent by weight of polymer solids of an epoxy resin.

These compositions, depending on their precise formulation, can be used as protective coatings, primers, primer-surfacers, and sealer compositions for metallic substrates.

19 Claims, No Drawings

WATER-BASED EPOXY ACRYLIC COATING COMPOSITIONS

BACKGROUND OF THE INVENTION

1. Field of the Invention

This invention relates broadly to water-based coating compositions and in particular to polymer binder emulsions for use in water-based coating compositions. More particularly, this invention relates to polymer binder emulsions for use in formulating protective coatings, primer, primer surfacer, and sealer compositions for metallic substrates.

2. Description of the Prior Art

Acrylic polymer lacquers, i.e., a liquid coating composition consisting of film-forming polymers such as alkyl acrylates and alkyl methacrylates dissolved in a solvent, are well known in the art and have been extensively utilized as exterior coatings for automobiles and trucks. In particular, lacquers of methyl methacrylate as shown in Johnson, U.S. Pat. Nos. 2,783,131 and 2,782,132, both issued Feb. 19, 1957; Crissiy, U.S. Pat. No. 2,934,509, issued Apr. 26, 1960 and Parker, U.S. Pat. No. 3,477,969, issued Nov. 11, 1969, have been utilized for that purpose. However, such lacquers in general lack the necessary adhesion properties and corrosion and rust resistance to enable them to be applied directly to the base metal substrate. It is therefore necessary to apply a primer composition to the metal substrate to achieve the necessary corrosion and rust resistance properties and to provide a surface to which the acrylic lacquer coatings will adhere. Moreover, where the primer composition is based on alkyd resins to which acrylic lacquers do not adhere well, an intermediate coat or sealer is commonly applied over the primer to provide a surface to which the acrylic lacquers will firmly adhere.

Primer and sealer compositions based upon epoxy-acrylic polymeric binders are known in the art. Thus, Rohrbacher, U.S. Pat. No. 3,509,086, issued Apr. 28, 1970, discloses a sealer composition comprising a polymeric binder of an acrylic polymer and a high molecular weight epoxy resin dissolved in an organic solvent and Walus, U.S. Pat. No. 3,707,516 discloses a coating composition useful as a primer, sealerless primer, or sealer comprising an acrylic-epoxy graft copolymer dissolved in a solvent. The epoxy-acrylic compositions disclosed in the aforementioned patents have a number of properties which make them attractive as primer and sealer compositions. For example, the compositions disclosed therein exhibit excellent chip and mar resistance, good adhesion to metal and improved corrosion resistance properties. However, these prior art sealer and primer compositions possess several serious disadvantages. In particular, these prior art compositions have the serious disadvantage of being solvent based compositions. Thus, these solvent-based compositions possess the serious disadvantage of emitting solvents to the atmosphere when they are dried thereby contributing to environmental pollution problems. Moreover, the solvents employed in such compositions are generally quite expensive and solvent reclamation is therefore desirable. However, present solvent reclamation techniques are quite complex and expensive. In view of the increased emphasis on environmental pollution control and the recently proposed legislation directed to the elimination of photochemically reactive solvents, these are serious disadvantages indeed.

It is accordingly a principal object of the present invention to provide water-based coating compositions for use as primer and sealer compositions to overcome the problem of solvent emissions. It is a further, more specific object of the present invention to provide water-based epoxy-acrylic compositions which retain most of the advantages of the prior art epoxy acrylic solvent-based compositions without their disadvantages.

SUMMARY OF THE INVENTION

A coating composition comprising an emulsion of a partially solubilized polymeric binder in water, wherein the polymeric binder comprises:

A. from about 25 to about 75 percent by weight of total polymer solids of an acrylic interpolymer derived from an alkyl acrylate or methacrylate ester, an ethylenically-unsaturated carboxylic acid and, optionally, at least one other copolymerizable ethylenically-unsaturated monomer, wherein at least part of the acid carboxylic groups have been iminated with an alkylenimine; and B. from about 25 to about 75 percent by weight of total polymer solids of an epoxy resin.

In preparing the compositions of the present invention, a high acid containing acrylic interpolymer is partially solubilized in such a manner as to encapsulate the epoxy resin to thereby provide aqueous emulsions of these materials. The precise method of preparing these compositions will vary depending upon the molecular weight and epoxy functionality of the epoxy resin employed in the composition. Methods of preparing the compositions of this invention are discussed in detail in the following section.

DESCRIPTION OF THE PREFERRED EMBODIMENTS

As indicated above, in preparing the compositions of the present invention, a high acid acrylic interpolymer is employed. The term "high acid acrylic interpolymer" as used in the context of the present invention is defined herein to mean an acid-containing acrylic interpolymer having an acid number of from about 20 to about 100. while acrylic polymers or interpolymers having an acid number of 20 are very useful in the compositions of this invention, the preferred acrylic interpolymers are those having an acid number of from about 40 to about 100 since polymers of this type are more readily solubilized than polymers having a lower acid number. The use of the high acid acrylic interpolymer as defined herein is essential in achieving the stable emulsions of the present invention.

The preferred high acid acrylic interpolymers which can be used in the compositions of the present invention are the acrylic interpolymers derived from an alkyl acrylate or alkyl methacrylate ester, an ethylenically unsaturated carboxylic acid, and optionally at least one other copolymerizable ethylenically-unsaturated monomer, wherein at least part of the acid carboxylic groups have been iminated with an alkylenimine.

Useful alkyl acrylate and methacrylate esters include the ethyl, methyl, propyl, butyl, hexyl, ethylhexyl, and lauryl acrylates and methacrylates as well as similar esters having from about 1 to about 20 carbon atoms in the alkyl group. A preferred group of alkyl acrylate and methacrylate esters are those esters having from 1 to 12 carbon atoms in the alkyl group.

Ethylenically unsaturated carboxylic acids which may suitably be employed include, for example, acrylic, methacrylic, crotonic, 3-butenoic, angelic, tiglic and the like.

The other ethylenically unsaturated monomer may be selected from the following classes: monoolefinic and diolefinic hydrocarbons, halogenated monoolefinic and diolefinic hydrocarbons, unsaturated esters of organic and inorganic acids, esters of unsaturated acids, organic nitriles, organic amides, and the like. Examples of such monomers include styrene, 1,3-butadiene, 2-chlorobutene, alpha-methyl styrene, alpha-chlorostyrene, 2-chloro-1,3-butadiene, 1,1-dichloroethylene, vinyl butyrate, vinyl acetate, allyl chloride, dimethyl maleate, divinyl benzene, diallylitaconate, triallyl cyanurate, acrylonitrile, methacrylonitrile, acrylamide, diacetone acrylamide, methacrylamide, n-butoxymethyl acrylamide, and the like.

A wide variety of alkylenimines, including substituted alkylenimines, can be employed in the preferred acrylic interpolymers of the present invention. Thus, alkylenimines such as 1,2-propylenimine, 1,3-propylenimine, ethylenimine, N-tolyl ethylenimine, N-hydroxyethyl ethylenimine are suitable.

Comonomers which are particularly preferred for use in preparing the high acid acrylic polymers of the present invention are methyl methacrylate, ethyl acrylate, styrene, vinyl toluene, acrylonitrile, methacrylonitrile, methacrylic acid, acrylic acid, 2-ethylhexyl acrylate, butyl acrylate, butyl methacrylate, and lauryl methacrylate. The preferred alkylenimines are ethylenimine, hydroxyethyl ethylenimine, and propylenimine.

It should be noted here that the specific amounts of the monomeric components employed in the above-described acrylic interpolymers can be varied considerably, depending on desired results and the selection of suitable amounts of such monomers is considered to be well within the skill of the art. As is readily apparent, in formulating the the high acid acrylic interpolymer, a sufficient quantity of ethylenically unsaturated carboxylic acid will be used to provide an interpolymer having an acid number within the above-stated range.

The amounts of high acid acrylic interpolymer employed in the polymeric binder of this invention may range from about 25 percent to about 75 percent by weight of total polymer solids in the composition. However, a preferred range of acrylic interpolymer is from about 50 percent to about 70 percent by weight of the total polymer solids with 50 percent by weight being especially preferred.

Acrylic interpolymers of the above general type and their method of preparation are well known in the art, for example, see U.S. Pat. No. 3,290,417, incorporated herein by reference.

As indicated above, the polymeric binder of the present invention, in addition to the high acid acrylic interpolymer, contains an epoxy resin. While virtually any epoxy resin can be used in the binder, epoxy resins which are especially preferred are the so-called high molecular weight epoxy resins. These high molecular weight epoxy resins are preferred because they are more readily processable to form polymeric binder emulsion, provide for better physical properties in the finished coating composition, and are readily formulated with pigment and other adjuvants to produce compositions having utility as primers, primer-surfacers, and sealers for metallic substrates. The term "high molecular weight epoxy resin" as employed herein means an epoxy resin having a molecular weight of at least about 20,000. However, epoxy resins having molecular weights of from about 20,000 to about 200,000 or even higher can be advantageously employed and are preferred. Epoxy resins having a molecular weight of from 40,000 to about 60,000 are especially preferred.

In view of the high molecular weights of these epoxy resins, the percentage by weight of the epoxy groups which terminate the molecule is very low. Accordingly, these high molecular weight epoxy resins can in general be represented by the structural formula:

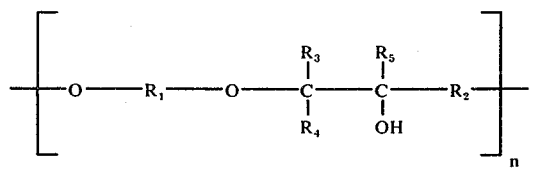

wherein $n$ is an integer sufficient to provide the epoxy resin with a molecular weight of at least 20,000, $R_1$ is a divalent aromatic radical selected from the group consisting of bisphenol A, substituted bisphenol A, bisphenol F and substituted bisphenol F; $R_2$ is a $C_1$–$C_5$ alkyl; and $R_3$, $R_4$, and $R_5$ are individually selected from the group consisting of hydrogen and $C_1$–$C_5$ alkyls. $R_1$, as shown above, can be a bisphenol A or a bisphenol F, both of which can be substituted. Suitable substituents include $C_1$–$C_5$ alkyls, halogens such as chlorine, bromine and fluorine, and $C_1$–$C_5$ alkoxy groups.

Preferred high molecular weight epoxy resins are those derived from epichlorohydrin-bisphenol A and epichlorohydrin-bisphenol F. High molecular weight epoxy resins of the above type are commercially available.

Low molecular weight epoxy resins, i.e., epoxy resins having a molecular weight below 20,000 (i.e., from about 400 to about 19,000) can also be employed in the polymeric binder emulsions of the present invention. However, these resins (referred to hereinafter as relatively low molecular weight epoxy resins) are not as well favored as the high molecular weight epoxy resins described above because they are more difficult to process in forming emulsions and compositions containing these resins are slightly deficient in physical properties (e.g., adhesion) and lack the versatility of those containing the high molecular weight epoxies. Thus, compositions based on relatively low molecular weight epoxy resins are principally useful as protective coatings.

Relatively low molecular weight epoxy resins which are suitable for use in the polymeric binder emulsions of the present invention are the polyepoxide resins. Useful polyepoxides are those having an epoxy functionality greater than 1.0, i.e., the average number of oxirane groups

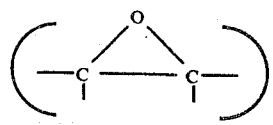

per molecule is greater than 1. These polyepoxides comprise a relatively large class of materials and have been described in numerous patents, e.g., U.S. Pat. Nos. 2,467,171; 2,615,007; 2,716,123; 3,030,336; 3,053,855; and 3,075,999.

Among the relatively low molecular weight polyepoxides which may be used herein are the polyglycidyl ethers of polyphenols, such as Bisphenol A. These may be obtained, for example, by esterification of a polyphenol with epichlorohydrin or dichlorohydrin in the presence of an alkali. In addition to Bisphenol A, phenolic compounds such as bis(4-hydroxyphenyl)2,2-propane, 4,4'-dihydrobenzophenone, bis(4-hydroxyphenyl)1,1-ethane, bis(4-hydroxyphenyl)1,1-isobutane, bis(4-hydroxytertiarybutylphenyl)2,2-propane, bis(2-hydroxynaphthyl)methane, 1,5-dihydroxynaphthalene, or the like can be used. The polyphenol can also be a novolak resin or a similar polyphenol resin.

Such polyglycidyl ethers of polyphenols correspond to the average formula:

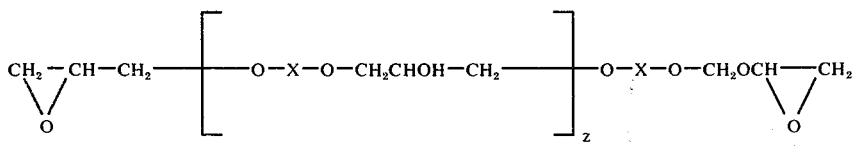

in which X represents an aromatic radical, and z represents a whole or fractional small number. Similarly, suitable polyglycidyl ethers of polyhydric alcohols are those which may be derived from such aliphatic polyhydric alcohols as ethylene glycol, diethylene glycol, triethylene glycol, 1,2-propylene glycol, 1,4-butylene glycol, 1,5-pentanediol, 2,4,6-hexanetriol, glycerol, and the like.

Other relatively low molecular weight epoxy resins which are suitable are the polyglycidyl esters of polycarboxylic acids, which are produced by the reaction of epichlorohydrin or a similar epoxy compound with an aliphatic or aromatic polycarboxylic acid, such as oxalic acid, succinic acid, glutaric acid, adipic acid, azelaic acid, phthalic acid, isophthalic acid, dicarboxylic acid, dimerized linolenic acid and the like. Examples are diglycidyl adipate and diglycidyl phthalate, and similar esters which correspond to the formula:

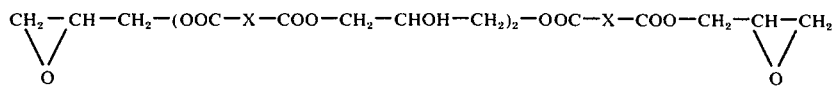

in which X represents a hydrocarbon radical, such as a phenyl or other aromatic radical, or aliphatic radical, and Z represents a whole or fractional small number.

There may also be employed relatively low molecular weight polyepoxides derived from the epoxidation of an olefinically unsaturated alicyclic compound. Included are diepoxides and higher epoxides, as well as mixtures of epoxides comprising, in part, one or more monoepoxides. These polyepoxides are non-phenolic and are obtained by epoxidation of alicyclic olefins, for example, by oxygen and selected metal catalysts by perbenzoic acid, by acetaldehyde monoperacetate or by peracetic acid. Amounts of the high molecular weight or relatively low molecular weight epoxy resins employed in the polymer binder emulsion of the present invention may range from about 25 to about 75 percent by weight of polymer solids. A preferred amount is from about 30 to about 50 percent by weight of polymer solids, with 50 percent by weight being especially preferred.

As indicated above, the method of preparing the stable polymeric binder emulsions of the present invention varies somewhat depending on the type epoxy resin used in preparing the binder. Where the epoxy resin employed is the preferred high molecular weight epoxy resin described above, the following general procedure is employed:

The high acid acrylic interpolymer is first prepared in known manner using conventional procedures by copolymerizing the desired monomers in well known polymerization solvents to form the acrylic interpolymer in solution. The polymerization procedure is carried forward under reflux conditions at temperatures ranging from about 130°C. to about 200°C. and standard polymerization catalysts are employed. For a detailed description of such acrylic interpolymers see U.S. Pat. No. 3,290,417. The resultant acrylic interpolymer solution is then admixed with the high molecular weight epoxy resin in the presence of a dispersing agent such as sodium oleate, dioctyl sodium sulfosuccinate, lauryl ammonium acetate, octadecyl ammonium chloride, glyceryl monolaurage, oleic acid, recinoleic acid, lecithin, zinc naphthenate, monyl phenolpoly(ethyleneoxy)phosphate ester, octyl polyethoxyethanol, mixtures of the alkylphenyl ether of polyethylene glycol in ethylene glycol and acetylenic glycol-2,4,7,9-tetramethyl-5-decyne-4,7-diols. The preferred dispersing agents are the mixtures of the alkyl phenyl ether of polyethylene glycol in ethylene glycol and acetylenic glycol-2,4,7,9-tetramethyl-5-decyne-4,7-diol. The amount of the dispersing agent may vary somewhat but generally an amount of from about 3 to about 5 percent by weight based on the solids content of the acrylic polymer and epoxy resin is sufficient.

As indicated above, the high acid acrylic interpolymer and high molecular weight epoxy resin are first mixed in the presence of a dispersing agent such as those described above. This mixture is then partially solubilized by first adding in undiluted form from about 40 percent to about 85 percent by weight of a solubilizing agent based upon the total weight of the solubilizing agent to be employed in the binder. The precise amount of undiluted solubilizing agent employed at this stage of the procedure is in general an amount sufficient to raise the pH of the mixture to at least about 7.5.

After mixing for about one to 4 hours, the remaining portion of the solubilizing agent in a water solution is added to form the stable polymeric binder emulsions of this invention. Enough water is usually added to provide a composition having a total solids content of from about 15 to about 30 percent, preferably about 25 percent, however compositions having a solids content of 5 percent or less, as well as those having a solids content of 80 percent or more may be employed in some instances.

The total amount of the solubilizing agent necessary to provide the emulsions herein may vary somewhat depending on the acidity of the acrylic interpolymer, but generally from about 5 to about 7 percent by weight based on the solids content of the acrylic polymer and the high molecular weight epoxy resin is sufficient. Also, it is desirable to have the solubilizing agent present in such an amount as to provide a finished composition having a pH in the range of from about 10.2 to 10.5, but compositions having a pH of 9 or less or 11 or more may likewise be employed.

The solubilizing agent that can be employed herein includes any basic, primary, secondary, or tertiary amine, for example, alkyl amines, such as methylamine, ethylamine, propylamine, butylamine, amylamine, dimethylamine, diethylamine, dipropylamine, dibutylamine, N-methylbutylamine, trimethylamine, triethylamine and tributylamine; cycloalkyl amines, such as cyclohexylamine; unsaturated amines such as allyl amine, 1,2-dimethylpentylamine and pyrrole; arylamines, such as aniline; aralkylamines, such as benzylamine and phenthylamine; alkarylamines, such as m-toluidine; cyclic amines, such as morpholine, pyrrolidine, pyridine and piperidine; diamines, such as hydrazine, methyl hydrazine, 2,3-toluenediamine, ethylenediamine, 1,2-naphthylene diamine and piperazine; and substituted amines, such as histamine, hydroxylamine, ethanolamine, diethanolamine, dimethyl ehtanolamine and triethanolamine. The preferred solubilizing agents are dimethylethanolamine and triethylamine.

The procedure employed to form polymeric binder emulsions wherein a relatively low molecular weight epoxy resin as defiend above is to be used in the binder is in general quite similar to the above-described procedure. However, in view of the higher epoxy group functionality of these resins, and consequently, their much greater reactivity, these resins require the exercise of greater care in handling and the use of additional materials to further defunctionalize the epoxy groups in order to achieve stable emulsions. For example, these relatively low molecular weight epoxy resins generally require the addition of esterification catalysts to semiesterify the epoxy resin as a means of defunctionalizing the epoxy groups. These esterification catalysts are normally added along with the epoxy resin to the acrylic interpolymer and admixed for about 25–45 minutes prior to the addition of the dispersing agent. Esterification catalysts which are suitable for the above purpose include, for example, metallic soaps such as zinc naphthenate, lead naphthenate, cobalt naphthenate, sodium naphthenate, and the like. Zinc naphthenate is the preferred esterification catalyst. The amount of esterification catalyst employed in the composition will vary somewhat and is dependent upon the functionality of the specific epoxy resin employed and thus the amount cannot be stated with precision. In general, the amount of esterification catalyst may range from approximately 0.5 to 5.0 percent by weight, or even higher, based upon the weight and type of epoxy resin used. In addition to the esterification catalysts, other materials to defunctionalize the epoxy groups can advantageously be employed. Thus, materials such as fatty acids, fatty acid amines and organic phosphates are suitable for that purpose. For example, fatty acids such as oleic, linoleic, ricinoleic and the like and organic phosphates such as isooctyl phosphate are suitable. A fatty acid amine such as Sipanol CY-2 available from Alcolac Chemical Company is especially suitable. The amounts of these additional materials employed to defunctionalize the epoxy resins are also dependent upon the functionality of the precise epoxy resin used. In general, the amounts of these materials are sufficient that when combined with the esterification catalyst, the epoxy groups of the relatively low molecular weight epoxy resins are substantially completely defunctionalized.

As mentioned above, coating compositions containing polymeric binders based on high acid acrylic interpolymers and relatively low molecular weight epoxy resins are slightly deficient in physical properties. Accordingly, compositions containing the low molecular weight epoxy resins are primarily useful as protective coatings.

Coating compositions of the present invention in addition to the polymeric binder may also contain pigments and adjuvants which are well known in the coating art. Thus, pigments such as, for example, titanium dioxide, talc, barytes, carbon black, strontium chromate, barium chromate, cadmium yellow, cadmium red, toluidine red, cobalt blue, calcium plumbate, ultramarine violet strontium chromate, basic silicate of white lead and the like are suitable. Typical adjuvants may include thickening agents, anti-foaming agents, adhesion additives, coalescing aids, and the like. The amounts of pigment and adjuvants employed in the coating compositions of this invention are dependent upon the specific properties in the particular water-based coating composition and the determination of such amounts is well within the skill of the art. As noted previously, coating compositions of this invention when based upon the preferred polymeric binder (i.e., high acid acrylic interpolymer high molecular weight epoxy resin) may be formulated with pigments and adjuvants to produce finished compositions having utility as primers, primer surfacers, and sealers for metallic substrates.

The following examples are submitted to further illustrate the nature of the present invention and should not be regarded as a limitation on the scope thereof. All parts and percentages in the Examples and throughout the specification are by weight unless otherwise specified.

EXAMPLE I

This example illustrates the preparation of an acrylic interpolymer having an acid number of about 40.

A reaction vessel equipped with a heating mantle, condenser, stirrer, and thermometer was charged with 249.7 parts of ethyl Cellosolve (ethylene glycol monoethyl ether) and heated to reflux at 130°C. Over a period of 2 hours, 229.7 parts of methyl methacrylate, 20.0 parts methacrylic acid, 1.0 part azobisisobutyronitrile and 0.5 part t-dodecyl mercaptan were added. Then an additional 1.1 parts of azobisisobutyronitrile and 132.8 parts of ethyl cellosolve were added over a 3-hour period. After an additional mixing period of one hour, 200.2 parts of ethyl cellosolve were again added to the reaction mixture. The mixture was then cooled to 66°C. and 3.6 parts of ethylenimine were added. After mixing for one hour, the mixture was removed and filtered.

The resultant acrylic interpolymer solution contained 30–31 percent solids and had a Gardner-Holdt viscosity of Z-6 at 25°C. The acrylic interpolymer had an acid number of 39–40.

EXAMPLE II

This example illustrates the preparation of an acrylic interpolymer having an acid number of about 84.

A reaction vessel equipped with a heating mantle, condenser, stirrer, and thermometer was charged with 1400 grams of ethyl cellosolve, 145 grams of cumene hydroperoxide, 455 grams of ethyl acrylate, and 62 grams of methacrylic acid. The mixture was then heated to reflux at 108°C. Over a period of 5 hours, an additional 1364 grams of ethyl acrylate and 186 grams of methacrylic acid were added. The mixture was then held for 1 hour, removed and filtered.

The resultant acrylic interpolymer solution had a solids content of 57.3 percent and a Gardner-Holdt viscosity of L at 25°c. The acrylic interpolymer had an acid number of 83–84.

EXAMPLE III

This example illustrates the preparation of an emulsion of a polymeric binder in water wherein the epoxy resin component of the binder is a high molecular weight epoxy resin.

To a steam jacketed mixer is charged 258.0 parts of the acrylic interpolymer of Example I and 193.5 parts of 684 EK-40 epoxy resin (an epichlorohydrin-bisphenol A type epoxy resin having a molecular weight of about 40,000, available from Dow Chemical Corporation). These ingredients are mixed for 20 minutes after which is added 25.55 parts of dispersing agents consisting of 10.05 parts of octyl polyethoxyethanol and 15.5 parts of a mixture of the alkyl phenyl ether of polyethylene glycol in ethylene glycol and acetylenic glycol-2,4,7,9-tetramethyl-5-decyne-4,7-diol.

The batch is then mixed and heated to 180°F. with rapid agitation and held at a temperature of 180°–190°F. for 4 hours. Thereafter, the batch is allowed to cool to 100°–120°F., followed by the addition of 16.3 parts of dimethyl ethanolamine. The batch is further mixed for one hour with rapid agitation following which 341.4 parts of an amine-water solution consisting of 5.40 parts of triethylamine and 336 parts of deionized water is added to the reaction mixture along with 1.54 parts of an anti-foaming agent (i.e., Foamacure 142 — an antifoaming agent available from Rohm and Haas Co.). The pH of the mixture is then adjusted to 10.2 with dimethyl ethanolamine to produce a stable polymeric binder emulsion.

EXAMPLE IV

Example III was repeated except that the acrylic interpolymer of Example II was substituted for the acrylic interpolymer used in Example III and an epichlorohydrin-bisphenol A type epoxy resin having a molecular weight of approximately 45,000 was substituted for the epoxy resin used in Example III. A polymeric binder emulsion is also achieved in this example.

EXAMPLE V

This example illustrates the preparation of a water-based sealer composition utilizing the polymeric binder of Example III.

The sealer composition was prepared by first premixing a pigment paste, grinding the paste, and then admixing the paste with a polymeric binder, water and other adjuvants to produce the finished compositions. The pigment paste had the following formulation (designated Formula I):

Formula 1

|  | Parts by Weight |
|---|---|
| Pigment Paste: | |
| Titanium dioxide | 17.20 |
| Barytes | 65.00 |
| Carbon black (Condectex SC) | 5.25 |
| Dimethyldioctadecyl ammonium bentonite | 3.50 |
| Triethylamine | 0.02 |
| Polymeric binder of Example III | 2.50 |
| Deionized water | 2.50 |
| Total | 95.97 |

The above pigment paste was premixed and then ground in known manner by passing through a sand mill. The ground paste was the admixed with the following ingredients to form the finished composition:

Formula 2

|  | Parts by Weight |
|---|---|
| Formula 1 (ground) | 95.97 |
| Polymeric binder of Example III | 56.60 |
| Deionized water | 41.90 |
| Thickener (amine-polyacrylate or polyacrylate acid | 8.43 |
| Total | 202.90 |

The above sealer composition was applied to a steel panel previously coated with a standard automotive high bake alkyd resin primer by spraying with a conventional air gun apparatus. The applied sealer composition was permitted to air dry and subsequently was topcoated with a conventional acrylic topcoat (i.e., a polymethyl methacrylate type). The adhesion of the acrylic lacquer topcoat to the sealer composition was evaluated in a known manner using a standard tape adhesion test and found to be excellent. The composite coatings exhibited good resistance to weathering and corrosion.

EXAMPLE VI

This example illustrates the preparation of a flash primer composition utilizing the polymeric binder of Example III.

The composition was prepared in substantially the same general manner as employed in Example V. Thus, a pigment paste was first prepared having the following formulation:

Formula 3

|  | Parts by Weight |
|---|---|
| Pigment Paste | |
| Titanium dioxide | 17.00 |
| Barytes | 65.00 |
| Carbon black | 5.00 |
| Dimethyl dioctyldecyl ammonium bentonite | 3.50 |
| Triethylamine | 1.52 |
| Polymeric binder of Example III | 57.19 |
| Deionized water | 24.99 |
| Total | 174.20 |

The ground paste was then admixed with the following ingredients to form the finished flash primer composition.

Formula 4

| | |
|---|---|
| Formula 3 (ground) | 174.20 |
| Polymeric binder of Example III | 433.61 |
| Phenolic resin solution* | 34.90 |
| Thickener (amine-polyacrylate or polyacrylate acid) | 97.00 |
| Deionized water | 344.59 |
| Total | 1084.30 |

*A 55% solution of a phenolic resin designated methylon 108 (available from General Electric Company) in ethyl cellosolve.

The above-prepared flash primer composition was tested for adhesion in the manner described in Example V. The composition showed excellent adhesion to a standard acrylate lacquer topcoat and the composition coatings exhibited good resistance to weathering and corrosion.

EXAMPLE VII

This example illustrates the preparation of a polymeric binder emulsion based on a high acid acrylic interpolymer and a relatively low molecular weight epoxy resin (i.e., a molecular weight of approximately 400).

To a reaction vessel equipped with heating mantle, condenser, stirrer, and thermometer is charged 19.37 parts of butyl cellosolve, 2.00 parts of cumene hydroperoxide, 2.86 parts of styrene, 0.86 part methacrylic acid, and 3.43 parts of ethyl acrylate. The above ingredients were then heated to reflux at 180°C. in one hour. Over a period of 5 hours, 8.29 parts of styrene, 2.57 parts of methacrylic acid, and 10.29 parts of ethyl acrylate were then added. The mixture was then held for 1½ hours at 180°-185°C. and subsequently cooled to 50°C. After cooling, 6.25 parts of an epichlorohydrin-bisphenol A type epoxy resin (i.e., molecular weight of approximately 400, epoxy equivalent of 185-192, and viscosity at 25°C. of 100-160 poises), 4.38 parts of ricinoleic acid, and 1.25 parts of an 8 percent solution of zinc naphthenate were added. After mixing for 30 minutes, 3.12 parts of octyl polyethoxy ethanol and 3.12 parts of octyl phenoxy polyethoxy ethanol were then added. The mixture was then heated to 80°-83°C. and held for 4 hours, then cooled to 50°C. After cooling, 5.0 parts of dimethyl ethanolamine were added, followed by one hour of mixing. Then 38.75 parts of an amine-water solution consisting of 1.25 parts of ethethylamine and 37.50 parts of deionized water were added to produce a polymeric binder emulsion in water. The resultant polymeric binder emulsion can be applied to a substrate in conventional manner and air-dried or baked to produce a protective coating having good adhesion to the substrate and good resistance to weathering and corrosion.

EXAMPLE VIII

This example illustrates the preparation of a polymeric binder emulsion wherein the epoxy resin used is an epoxy resin having a molecular weight of approximately 100.

To a reaction vessel equipped with heating mantle, condenser, stirrer, and thermometer is charged 19.6 parts of ethyl Cellosolve, 1.40 parts of cumene hydroperoxide, 6.37 parts of ethyl acrylate, and 0.87 part of methacrylic acid. The above ingredients were heated to reflux at 108°C. in 1 hour. Over a period of 4 hours, 19.10 parts of ethyl acrylate and 2.60 parts of methacrylic acid are added. The mixture is held for 1 hour and then cooled to 30°C. After cooling, 13.4 parts of a solid epichlorohydrin-Bisphenol A type epoxy resin (i.e., molecular weight about 1,000, epoxy equivalent 450-550, Gardner-Holdt viscosity at 25°C. of D-G, and melting point 65°-75°C.) and 6.6 parts of ethyl cellosolve were added. After the epoxy resin dissolved, 3.12 parts of octyl polyethoxyethanol, 3.12 parts of octyl phenoxy polyethoxy ethanol and 1.25 parts of an 8 percent solution of zinc naphthenate were added followed by mixing for 30 minutes. The mixture was then heated to 80°-83°C. and held for 4 hours after which 6.25 parts of dimethyl ethanolamine were added. After mixing for one hour, 38.75 parts of an amine-water solution consisting of 1.25 parts of triethylamine and 37.5 parts of deionized water were added.

The resultant composition is a polymeric binder emulsion in water. The polymeric binder emulsion can be applied to a substrate in conventional manner and air-dried or baked to form a protective coating which exhibits good adhesion to the substrate and good resistance to weathering and corrosion.

According to the provisions of the Patent Statutes, there are described above the invention and what are now considered its best embodiments. However, within the scope of the appended claims, it is to be understood that the invention can be practiced otherwise than as specifically described.

We claim:

1. A coating composition comprising an emulsion of a partially-solubilized polymeric binder in water, wherein the polymeric binder comprises:

A. from about 25 to about 75 percent by weight of polymer solids of an acrylic interpolymer derived from an alkyl acrylate or methacrylate ester, an ethylenically unsaturated carboxylic acid and, optionally, at least one other copolymerizable ethylenically-unsaturated monomer, wherein at least part of the acid carboxylic groups have been iminated with an alkylenimine, wherein said interpolymer is partially solubilized with a solubilizing agent, and wherein said acrylic interpolymer prior to partial solubilization with said solubilizing agent has an acid number of from about 20 to about 100; and B. from about 25 to about 75 percent by weight of polymer solids of a high molecular weight epoxy resin having the structure:

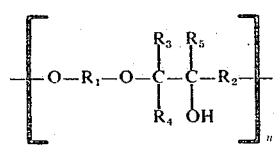

wherein $n$ is an integer sufficient to provide the resin with a molecular weight of at least about 20,000; $R_1$ is a divalent aromatic radical selected from the group consisting of bisphenol A, substituted bisphenol A, bisphenol F, and substituted bisphenol F; $R_2$ is a $C_1$ to $C_5$ alkyl; and $R_3$, $R_4$ and $R_5$ are individually selected from the group consisting of hydrogen and a $C_1$ to $C_5$ alkyl.

2. The composition as recited in claim 1 wherein the polymeric binder comprises from about 50 to about 70 percent by weight of polymer solids of the acrylic interpolymer and from about 30 to about 50 percent by weight of polymer solids of the epoxy resin.

3. The composition as recited in claim 1 wherein the polymeric binder comprises 50 percent by weight of polymer solids of the acrylic interpolymer and 50 percent by weight of polymer solids of the epoxy resin.

4. The composition as recited in claim 1 wherein the alkyl acrylate is selected from the group consisting of ethyl, methyl, propyl, butyl, hexyl, ethylhexyl and lauryl acrylate.

5. The composition as recited in claim 1 wherein the alkyl methacrylate is selected from the group consisting of ethyl, methyl, propyl, butyl, hexyl, ethylhexyl, and lauryl methacrylate.

6. The composition as recited in claim 1 wherein the ethylenically unsaturated carboxylic acid is selected from the group consisting of acrylic, methacrylic, crotonic, 3-butenoic, angelic, and tiglic acid.

7. The composition as recited in claim 1 wherein the other ethylenically unsaturated monomer is selected from the group consisting of monoolefinic and diolefinic hydrocarbons, halogenated monoolefinic and diolefinic hydrocarbons, unsaturated esters of organic and inorganic acids, esters of unsaturated acids, organic nitriles, and organic amides.

8. The composition as recited in claim 1 wherein the other ethylenically unsaturated monomer is selected from the group consisting of styrene, vinyl toluene, acrylonitrile and methacrylonitrile.

9. The composition as recited in claim 1 wherein the alkylenimine is selected from the group consisting of ethylenimine, hydroxyethyl ethylenimine, and propylenimine.

10. The composition as recited in claim 1 wherein the epoxy resin has a molecular weight of from about 40,000 to about 60,000.

11. A water-based sealer composition comprising:
A. an emulsion of a partially-solubilized polymeric binder in water, wherein the polymeric binder comprises:
1. from about 25 to about 75 percent by weight of polymer solids of an acrylic interpolymer derived from an alkyl acrylate or methacrylate ester, an ethylenically unsaturated carboxylic acid, and, optionally, at least one other copolymerizable ethylenically unsaturated monomer, wherein at least part of the acid carboxylic groups have been iminated with an alkylenimine, wherein said interpolymer is partially solubilized with a solubilizing agent, and wherein said acrylic interpolymer prior to partial solubilization with said solubilizing agent has an acid number of from about 25 to about 100; and
2. from about 25 to about 75 percent by weight of polymer solids of a high molecular weight epoxy resin having the structure:

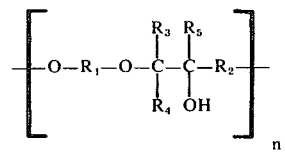

wherein $n$ is an integer sufficient to provide the resin with a molecular weight of at least about 20,000; $R_1$ is a divalent aromatic radical selected from the group consisting of bisphenol A, substituted bisphenol A, bis-phenol F, and substituted bisphenol F; $R_2$ is a $C_1$ to $C_5$ alkyl; and $R_3$, $R_4$, and $R_5$ are individually selected from the group consisting of hydrogen and a $C_1$ to $C_5$ alkyl.

12. The sealer compostion as recited in claim 11 wherein the polymeric binder comprises from about 50 to about 70 percent by weight of polymer solids of the acrylic interpolymer and from about 30 to about 50 percent by weight of polymer solids of the epoxy resin.

13. The sealer composition as recited in claim 11 wherein the alkyl acrylate is selected from the group consisting of ethyl, methyl, propyl, butyl, hexyl, ethylhexyl, and lauryl acrylate.

14. The sealer composition as recited in claim 11 wherein the alkyl methacrylate is selected from the group consisting of ethyl, methyl, propyl, butyl, hexyl, ethylhexyl, and lauryl methacrylate.

15. The sealer composition as recited in claim 11 wherein the ethylenically unsaturated carboxylic acid is selected from the group consisting of acrylic, methacrylic, crotonic, 3-butenoic, angelic, and tiglic acid.

16. The sealer composition as recited in claim 11 wherein the other ethylenically unsaturated monomer is selected from the group consisting of monoolefinic and diolefinic hydrocarbons, halogenated monoolefinic and diolefinic hydrocarbons, unsaturated esters of organic and inorganic acids, esters of unsaturated acids, organic nitriles, and organic amides.

17. The sealer composition as recited in claim 11 wherein the other ethylenically unsaturated monomer is selected from the group consisting of styrene, vinyl toluene, acrylonitrile and methacrylonitrile.

18. The sealer composition as recited in claim 11 wherein the alkylenimine is selected from the group consisting of ethylenimine, N-hydroxyethyl ethylenimine and propylenimine.

19. The sealer composition as recited in claim 11 wherein the epoxy resin has a molecular weight of from about 40,000 to about 60,000.

* * * * *